April 16, 1929.  L. KUHL  1,709,674
SPEED INDICATOR
Filed Jan. 28, 1926
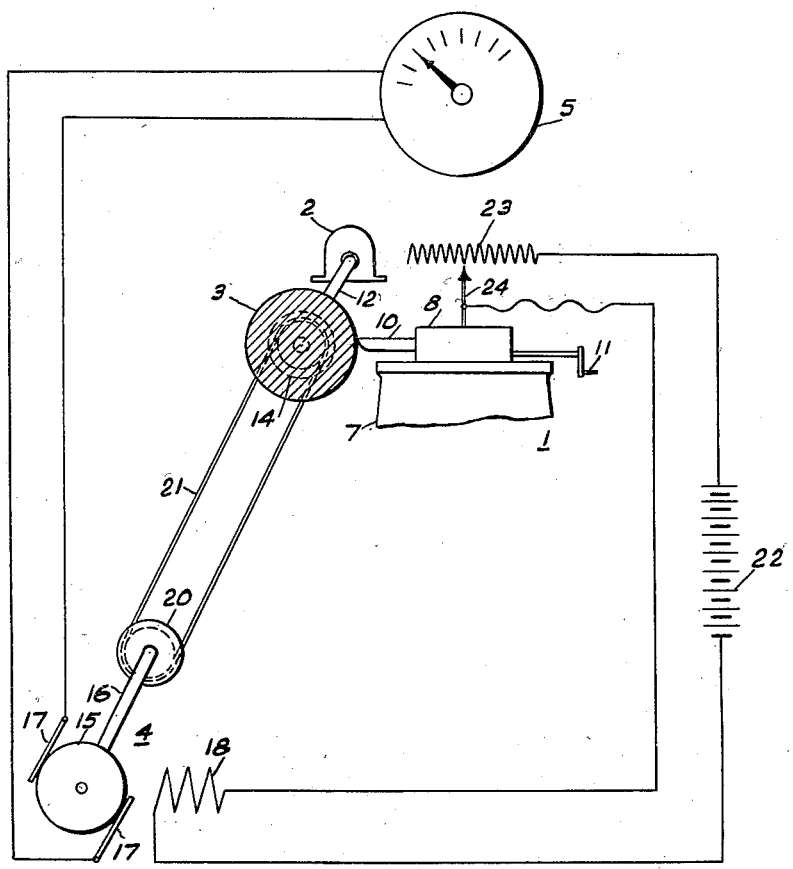
WITNESSES:
INVENTOR
Leo Kuhl
BY
ATTORNEY Patented Apr. 16, 1929.

1,709,674

UNITED STATES PATENT OFFICE.

LEO KUHL, OF BERLIN-CHARLOTTENBURG, GERMANY, ASSIGNOR TO WESTINGHOUSE ELECTRIC & MANUFACTURING COMPANY, A CORPORATION OF PENNSYLVANIA.

SPEED INDICATOR.

Application filed January 28, 1926, Serial No. 84,528, and in Germany February 28, 1925.

My invention relates to speed indicators and particularly to devices for indicating the speed of cutting tools relative to work objects.

One object of my invention is to provide means whereby the speed of cutting tools relative to work objects may be effectively indicated.

Another object of my invention is to provide means for energizing an electro-responsive device, such as an indicator, by an electromotive force proportional, or in any other predetermined relation, to the relative movement of the cutting tool and a work object and their relative positions.

A further object of my invention is to provide a simple and effective means whereby the speed of a cutting tool may be maintained substantially constant relative to a work object.

Accordingly, in practicing my invention I provide an electro-responsive device such as an indicator, means actuated in accordance with movement of the cutting tool element, or in accordance with movement of the element to be cut for generating an electromotive force to actuate the electro-responsive device and means for modifying said force in accordance with movement of the other element. By this means, the change in linear cutting speed of a tool relative to an object caused by decreased diameter of the object is effectively indicated whereby the cutting speed may be adjusted manually.

The single figure of the accompanying drawings is a diagrammatic view of a speed indicator device embodying my invention.

The device comprises in general a cutting machine or device 1, a driving means or motor 2 for actuating a work object 3, a tachometer or generating device 4 and an indicating device 5.

The cutting machine 1 comprises a standard or base support 7, a carriage or member 8 movably mounted on the standard 7, a tool 10 carried by the carriage 8 and an operating handle member 11 for moving the carriage 8 and tool 10 toward and from the work object 3.

The motor 2, merely indicative of any suitable driving means, is adapted to rotate a shaft 12 upon which the work object 3 and a pulley 14 are mounted.

The tachometer or generator 4 comprises an armature 15 that is mounted on a shaft 16, brushes 17 that are connected to the indicating device 5 and an exciting winding 18. The shaft 16 is provided with a pulley 20 which is connected to the pulley 14 by a belt 21.

The exciting or field winding 18 of the armature 15 is connected in series relation to a battery 22, or other suitable source of electromotive force, a resistor 23 and a movable contact arm 24 mounted on the carriage 8.

In operation, assuming that the shaft 12 rotates at a constant speed, the armature 15 will generate an electromotive force substantially in proportion to the speed of the shaft 12, thereby causing the indicator 5 to give a certain indication.

As the cutting tool 10 is advanced to the left, as viewed in the drawing, to cut the object 3, the arm 24 is moved along the resistor 23 to change the excitation of the armature 15 and to thereby affect the electromotive force generated thereby in accordance with the decrease in the diameter of the object 3. This change will be immediately indicated on the indicator 5 which may be controlled by the operator of the device 1.

A device for rendering the operations automatic may be substituted for the indicator 5 in accordance with any of several well known regulating means, the main object herein being to show an electro-responsive device such as the indicator 5 or regulator which is responsive to the movement of a work object and the adjustment of a cutting tool as set forth.

While I have shown and described a particular form of my invention changes may be effected therein without departing from the spirit of the scope thereof as set forth in the appended claims.

I claim as my invention:

1. The combination with means for moving a work object, a cutting tool and means for moving the cutting tool relative to said object, of electro-responsive means, and means controlled by movement of said object and the position of the tool moving means for automatically actuating said electro-responsive means.

2. The combination with means for moving a work object, a cutting tool and means for moving the cutting tool relative to said object, of electro-responsive means, and means for actuating the same comprising means for generating an electro-motive force in accordance with movement of one of said moving means and means for automatically modifying said force in accordance with the position of the other moving means.

3. The combination with means for moving a work object, a cutting tool and means for moving the cutting tool relative to said object, of electro-responsive means, and means for actuating the same comprising an armature moved by one of said moving means and connected to said electro-responsive means, and an exciting circuit for said armature including a source of electro-motive force, a field winding and a variable impedance device controlled by the other moving means.

4. The combination with means for moving a work object, a cutting tool and means for moving the cutting tool relative to said object, of electro-responsive means, and means for automatically actuating said electro-responsive means in accordance with the movement of said object and the position of said tool.

5. The combination with means including a rotatable member for turning a work object, a cutting tool and means for advancing the tool against the object, of electro-responsive means, and means for actuating the same comprising an armature in circuit therewith and rotated in proportion to rotation of the work object, an exciting circuit for the armature and means for adjusting one of said circuits in accordance with the position of the cutting tool.

6. The combination with means including a rotatable member for turning a work object, a cutting tool and means for advancing the tool against the object, of electro-responsive means, and means for actuating the same comprising an armature in circuit therewith and rotated in proportion to rotation of the work object, an exciting circuit for the armature and means for adjusting the exciting circuit in response to the adjustment of the cutting tool.

In testimony whereof, I have hereunto subscribed my name this 30th day of December, 1925.

LEO KUHL.